United States Patent [19]

Kano et al.

[11] Patent Number: 4,780,531
[45] Date of Patent: Oct. 25, 1988

[54] DICHORIC DYE FOR COLOR LIQUID CRYSTALS HAVING HALOGEN SUBSTITUTED IN PERYLENE STRUCTURE

[75] Inventors: Mitsuru Kano; Yoshinori Kato; Yoshimi Kamijo, all of Furukawa; Yoshinari Sakikubo, Hyogo; Yoshio Takeda, Himeji; Takanori Sato, Hyogen, all of Japan

[73] Assignee: Alps Electric Co., Ltd., Japan

[21] Appl. No.: 933,228

[22] Filed: Nov. 20, 1986

[30] Foreign Application Priority Data

Nov. 29, 1985 [JP] Japan ................... 60-268763

[51] Int. Cl.$^4$ ............... C07D 471/22; C09B 35/031; C09B 35/037; C09K 3/34
[52] U.S. Cl. ................... 534/577; 534/752; 252/299.1; 252/299.5; 252/299.61; 252/299.62; 350/349; 546/29
[58] Field of Search .................. 534/577, 752; 252/299.1, 299.5; 350/349; 546/29

[56] References Cited

U.S. PATENT DOCUMENTS

| | | |
|---|---|---|
| 4,363,473 | 12/1982 | Moeller et al. ............ 534/577 X |
| 4,547,309 | 10/1985 | Mochizuki et al. ......... 534/572 X |
| 4,607,097 | 8/1986 | Kano et al. .............. 534/577 |

FOREIGN PATENT DOCUMENTS

| | | |
|---|---|---|
| 59-223786 | 12/1984 | Japan ............... 534/577 |
| 61-91285 | 5/1986 | Japan ............... 534/577 |

Primary Examiner—Floyd D. Higel
Attorney, Agent, or Firm—Guy W. Shoup; Paul J. Winters

[57] ABSTRACT

A dichroic dye for coloring liquid crystal compositions are disclosed which is represented by the following general formula:

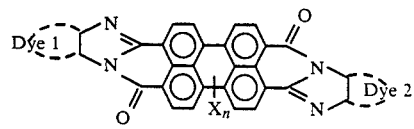

in which Dye 1 and Dye 2 each represents a group of atoms necessary to form a linear dye structure containing an azo, azomethine or ester group; X represents a halogen atom; and n represents an integer of from 1 to 10. The dye is suited for use in color liquid crystal display devices, e.g., of guest-host type.

7 Claims, No Drawings

DICHORIC DYE FOR COLOR LIQUID CRYSTALS HAVING HALOGEN SUBSTITUTED IN PERYLENE STRUCTURE

BACKGROUND OF THE INVENTION

1. Field of the Invention

The present invention relates to a novel dichroic dye for color liquid crystals. In particular, it relates to a dichroic dye for color liquid crystals to be used, for example, in a guest-host liquid crystal display (hereinafter referred to as G-HLCD) or the like.

2. Description of the Prior Art

As dichroic dyes to be used in liquid crystals are known those having azo, azomethine or antroquinone structures.

Dichroic dyes to be used in liquid crystals have to meet various requirements. Of the requirements to be met by the dichroic dyes, the followings are of particular importance.

(1) To have a high dichroic ratio (hereinafter referred to as CR);

(2) To have a high molecular extinction coefficient (hereinafter referred to as $\epsilon$);

(3) To have a long service life (i.e., to have an excellent resistance to light); and (4) To have a high solubility (hereinafter referred to as S).

However, the service lifes of azo and azomethine dyes are generally short although their $\epsilon$ values are generally high. On the other hand, antraquinone dyes, although their service lifes are generally long, generally have low CR and $\epsilon$ values. Accordingly, few dichroic dyes have been known that satisfy all the requirements (1), (2), (3) and (4) described above.

The present inventors had previously found that dyes represented by the following General Formula (1):

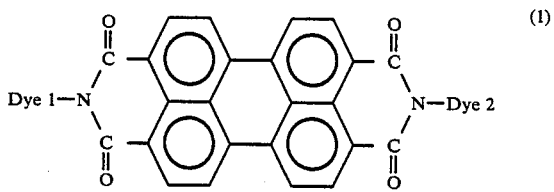

in which Dye 1 and Dye 2 each represents a group of atoms necessary to form a linear dye structure containing an azo, azomethine or ester group, have not only large CR and $\epsilon$ values, but also a long service life (see Japanese Patent Application Nos. 98,057/83 and 130,364/83).

However, it was later found that the dichroic dyes represented by the above General Formula (1) have a S value more or less lower than those of previously known dyes.

DESCRIPTION OF THE INVENTION

It is, therefore, an object of the present invention to provide a dichroic dye for liquid crystals.

It is another object of the invention to provide a dichroic dye which satisfies all the four requirements described hereinabove.

It has now been found that these and other objects of the present invention can be achieved by a dichroic dye having a perylene structure substituted with halogen atoms and comprising, at the both ends thereof, linear dye residues containing such a group as azo, azomethine and azoxy as in the case of dyes represented by General Formula (1). The present invention has been accomplished based on the above finding.

According to the present invention, there is provided a dichroic dye for liquid crystals, which is represented by the following General Formula (2):

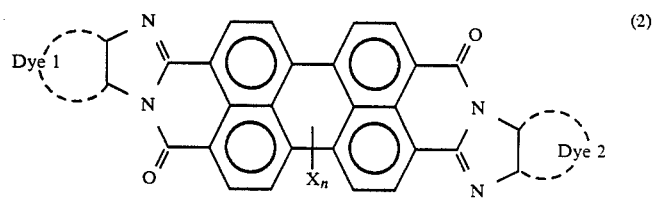

in which Dye 1 and Dye 2 each represents a group of atoms necessary to form a linear dye structure containing an azo, azomethine or ester group; X represents a halogen atom; and n represents an integer of from 1 to 10.

One of the most important features of the dyes according to the invention is that at least part of the hydrogen atoms contained in the perylene structure is substituted with halogen atoms, so as to attain an enhanced solubility (s), while maintaining other parametric characteristics, such as CR, $\epsilon$, etc., at satisfactory levels as those of the dichroic dyes represented by General Formula (1).

Liquid crystal compositions which can be colored by the dyes according to the invention include those composed of nematic, cholesteric and smectic type liquid crystals. H-CLDs with excellent qualities can be prepared by employing the dyes according to the invention.

The dyes according to the invention can be used either individually or as mixtures. It is also possible to use the dyes in combination with one or more dyes. In general, the suitable concentration of the dyes is from 0.01 to 20% by weight, preferably from 0.01 to 5% by weight, based on the weight of the liquid crystals used.

EXAMPLES

On a glass substrate was formed a transparent conductive layer consisting of indium and tin oxides. On the conductive layer was then formed an insulating layer of silicon dioxide. Thereafter, an orienting agent (an organosilane) was coated thereon to form a thin layer which is then subjected to rubbing, i.e., homogeneous orienting treatment. Liquid crystals cells were prepared therefrom.

In a cyanobiphenyl-type liquid crystal composition having a positive dielectric anisotropy were dissolved individually, in an amount of 1%, dichroic dyes shown in Table 1, and the resulting compositions were separately enclosed in the liquid crystal cells prepared above to give G-HLCDs.

For the purpose of comparison, G-HLCDs incorporated with known dichroic dyes shown in Table 2 were prepared in the same manner as above.

Characteristics of the thus prepared C-HLCDs are shown in Tables 1 and 2. In the tables, $\lambda_{max}$ means the wavelength at the absorption peaks of a dye incorporated in the liquid crystal composition, and S means the solubility in percents of a dye in the liquid crystal composition. The service life (i.e., the fastness to light) of the dyes was evaluated by irradiating to the cells an ultraviolet ray with an intensity of ca. 42 times that of usual light. The fading indicates the period of time (hrs) elapsed from the start of the irradiation and the point of time when the color density of the cell was reduced to 80% of its initial value, and the change in current means the period of time (hrs) elapsed between the start of the irradiation and the point of time when the intensity of the current increased to 3 times that of the initial stage.

TABLE 1

| Example | Structural Formula | $\lambda_{max}$ (nm) | CR | S (%) | Service Life (Hrs) Fading | Change in Current |
|---|---|---|---|---|---|---|
| 1 | (structure with COOC$_8$H$_{17}$ group, n = 3.0) | 614 / 570 | 11.3 / 12.5 | >7.0 | 150 | 150 |
| 2 | (structure with C$_9$H$_{19}$ group, n = 3.0) | 613 / 568 | 11.2 / 9.9 | >7.0 | 150 | 150 |
| 3 | (structure with C$_9$H$_{19}$ group, n = 4.0) | 616 / 575 | 10.0 / 9.4 | 7.0 | 150 | 130 |

TABLE 1-continued

| Example | Structural Formula | $\lambda_{max}$ (nm) | CR | S (%) | Service Life (Hrs) Fading | Service Life (Hrs) Change in Current |
|---|---|---|---|---|---|---|
| 4 | (structure with Cl$_n$, n = 3.0, C$_9$H$_{19}$ groups) | 610 / 565 | 11.3 / 9.8 | 5.0 | 150 | 130 |
| 5 | (structure with Br$_n$, n = 8.0, C$_7$H$_{15}$, C$_6$H$_{13}$ groups, CH=N linkage) | 610 / 550 | 10.5 / 9.5 | 7.0 | 150 | 150 |
| 6 | (structure with Br$_n$, n = 5.0, C$_2$H$_5$, C$_7$H$_{15}$ groups, N=N linkage with N→O) | 615 / 565 | 11.0 / 9.9 | >7.0 | 150 | 150 |
| 7 | (structure with Br$_n$, n = 10.0, C$_9$H$_{19}$, COOC$_8$H$_{17}$ groups) | 610 / 550 | 5.0 / 4.2 | >7.0 | 150 | 100 |

TABLE 2

| Comparative Example | Structural Formula | $\lambda_{max}$ (nm) | CR | S (%) | Service Life (Hrs) | | |
|---|---|---|---|---|---|---|---|
| | | | | | Fading | Change in Current | |
| 1 | (structure with H₂N–C₆H₄–N bridged perylene diimide with –C₆H₄–NH₂) | 510 | 11.5 | 0.8 | 150 | 100 | |
| 2 | (perylene diimide with N(C₇H₁₅)₂ substituted phenyl groups) | 535 | 12.1 | 1.0 | 150 | 150 | |
| 3 | (bis-azomethine with C₄H₉O–C₆H₄–N=CH– and –CH=N–C₆H₄–OC₄H₉ on naphthalene) | 450 | 8.1 | 3.0 | 150 | 100 | |
| 4 | (anthraquinone with NH–C₆H₄–C₄H₉ and OH substituents) | 585 | 3.5 | 2.5 | 200 | 30 | |
| 5 | (perylene diimide with C₉H₁₉–C₆H₄–OOC– and –COOC₈H₁₇ aryl substituents) | 600 / 550 | 11.0 / 9.5 | 0.5 | 150 | 150 | |

It would be seen from Tables 1 and 2 that the dyes according to the invention used in Examples 1 to 7 have S values much greater than that of the dye used in Comparative Example 5. This shows that the substitution of the hydrogen atoms in the perylene structure with halogen atoms favourably affects the S values of the dyes. It is, however, preferable that the number of hydrogen atoms substituted by halogen atoms does not exceed 9 as seen in Example 7, where lower CR values are resulted. Most preferable number of substitution is from 1 to 8. It is also seen from Table 1 that the dyes substituted with bromine atoms used in Examples 1, 2, 3, 5, 6 and 7 have greater S values than that of the dye substituted with chlorine atoms used in Example 4. With regard to the kind of halogens to be contained in the perylene structure, bromine atoms can therefore be most preferable.

In conclusion,, the dichroic dyes according to the invention possess S values much greater than hitherto known dyes, and at the same time retain CR and other characteristics at a satisfactorily high level as those of the hitherto known dyes. In other words, the dichroic dyes according to the invention satisfies all the four requirements to be met by dichroic dyes.

What is claimed is:

1. A dichroic dye for liquid crystal compositions having the following formula:

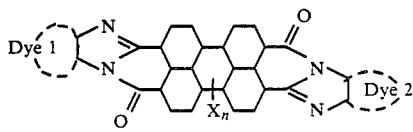

in which Dye 1 and Dye 2 each represent a dye radical having a linear structure and contain an azo group, an azomethine group, or a carboxylic acid ester group; X is halogen; and n is an integer from 3 to 10.

2. A dichroic dye as claimed in claim 1, wherein said halogen element is bromine.

3. A dichroic dye as claimed in claim 1, wherein n is a positive integer of from 3 to 8.

4. A color liquid crystal composition having dissolved therein 1% of a dichroic dye as defined in claim 1.

5. A dichroic dye as claimed in claim 1, wherein the solubility of the dye in a liquid crystal composition is from 5% to greater than 7%.

6. A color liquid crystal composition having dissolved therein 1% of a dichroic dye as defined in claim 2.

7. A color liquid crystal composition having dissolved therein 1% of a dichroic dye as defined in claim 3.

* * * * *